(12) United States Patent  (10) Patent No.: US 9,352,233 B2
Smith  (45) Date of Patent: May 31, 2016

(54) RECOMMENDATION ENGINE FOR ELECTRONIC GAME SHOPPING CHANNEL

(71) Applicant: Nintendo of America Inc., Redmond, WA (US)

(72) Inventor: Darren Smith, Sammamish, WA (US)

(73) Assignee: NINTENDO OF AMERICA INC., Redmond, WA (US)

( * ) Notice: Subject to any disclaimer, the term of this patent is extended or adjusted under 35 U.S.C. 154(b) by 0 days.

(21) Appl. No.: 14/246,758

(22) Filed: Apr. 7, 2014

(65) Prior Publication Data

US 2015/0099589 A1  Apr. 9, 2015

Related U.S. Application Data

(63) Continuation of application No. 13/647,584, filed on Oct. 9, 2012, now Pat. No. 8,721,455, which is a continuation of application No. 12/578,790, filed on Oct. 14, 2009, now Pat. No. 8,298,087.

(60) Provisional application No. 61/142,313, filed on Jan. 2, 2009, provisional application No. 61/240,672, filed on Sep. 9, 2009.

(51) Int. Cl.
*A63F 13/00* (2014.01)
*A63F 13/792* (2014.01)
*G06Q 30/02* (2012.01)
*A63F 13/35* (2014.01)

(52) U.S. Cl.
CPC .............. *A63F 13/792* (2014.09); *A63F 13/35* (2014.09); *G06Q 30/0255* (2013.01); *A63F 2300/513* (2013.01); *A63F 2300/5513* (2013.01); *A63F 2300/5546* (2013.01); *A63F 2300/5586* (2013.01)

(58) Field of Classification Search
CPC ........... A63F 2300/10; A63F 2300/208; A63F 2300/55; A63F 2300/5546; A63F 2300/556
USPC ..................................... 463/42, 43; 705/26.7
See application file for complete search history.

(56) References Cited

U.S. PATENT DOCUMENTS

| | | | |
|---|---|---|---|
| 5,715,399 A | 2/1998 | Bezos | |
| 5,754,938 A * | 5/1998 | Herz et al. | ..................... 725/116 |
| 5,754,939 A | 5/1998 | Herz et al. | |
| 5,758,257 A | 5/1998 | Herz et al. | |
| 5,835,087 A | 11/1998 | Herz et al. | |
| 5,890,152 A | 3/1999 | Rapaport et al. | |
| 6,088,722 A | 7/2000 | Herz et al. | |
| 6,134,532 A | 10/2000 | Lazarus et al. | |
| 6,169,986 B1 | 1/2001 | Bowman et al. | |

(Continued)

OTHER PUBLICATIONS

Chung, Ronald, et al., "Integrated Personal Recommender Systems," ICEC '07, Aug. 19-22, 2007, Minneapolis, MN (2007).

(Continued)

*Primary Examiner* — James S McClellan
(74) *Attorney, Agent, or Firm* — Nixon & Vanderhye P.C.

(57) ABSTRACT

A recommendation service is provided for recommending computer video game titles to players. The recommendation service offers suggestions for game titles to purchase or rent based on playing usage related parameters for each particular player. A profile is created based on several factors that represents the player's affinity to each factor. Communication and use of player usage data may be strictly conditioned on a player's knowledge and consent.

20 Claims, 6 Drawing Sheets

(56) References Cited

U.S. PATENT DOCUMENTS

| | | |
|---|---|---|
| 6,266,649 B1 | 7/2001 | Linden et al. |
| 6,317,722 B1 | 11/2001 | Jacobi et al. |
| 6,606,102 B1 | 8/2003 | Odom |
| 6,625,609 B1 | 9/2003 | McDade et al. |
| 6,629,079 B1 | 9/2003 | Spiegel et al. |
| 6,782,370 B1 | 8/2004 | Stack |
| 6,912,505 B2 | 6/2005 | Linden et al. |
| 7,113,917 B2 | 9/2006 | Jacobi et al. |
| 7,775,886 B2 * | 8/2010 | Krishnamoorthy et al. .... 463/43 |
| 2003/0181242 A1 * | 9/2003 | Lee et al. ................. 463/42 |
| 2003/0225777 A1 | 12/2003 | Marsh |
| 2004/0177025 A1 | 9/2004 | Spoonhower et al. |
| 2006/0117105 A1 * | 6/2006 | Lesenne et al. ............. 709/226 |
| 2006/0133768 A1 * | 6/2006 | Ellis, Jr. ..................... 386/52 |
| 2006/0179126 A1 * | 8/2006 | Fujino et al. ............... 709/219 |
| 2007/0054738 A1 * | 3/2007 | Muir .................... A63F 13/12 463/42 |
| 2007/0078849 A1 * | 4/2007 | Slothouber .................. 707/5 |
| 2008/0020845 A1 | 1/2008 | Low et al. |
| 2009/0005174 A1 * | 1/2009 | Joo et al. ................... 463/42 |
| 2009/0197681 A1 * | 8/2009 | Krishnamoorthy et al. .... 463/42 |

OTHER PUBLICATIONS

Drucker, Steven M., et al., "The Visual Decision Maker—A recommendation system for collocated users," Designing for User Experiences; vol. 135, Proceedings of the 2005 conference on Designing for User Experience, San Francisco, California (2005).

Frankowski, Dan, et al., "Recommenders Everywhere: The WikiLens Community-Maintained Recommender System," WikiSym '07, Oct. 21-23, 2007, Montreal, Quebec, Canada (2007).

Wei, Yan Zheng, et al., "A Market-Based Approach to Recommender Systems," ACM Transactions on Information Systems, vol. 23, No. 3, Jul. 2005, pp. 227-266 (2005).

Wikipedia, the free encyclopedia, "Recommender System" (last modified Dec. 31, 2008).

* cited by examiner

"user owns" weight
"user rates" weight
"time played" weight
"Recommended By Friend"

*Fig. 3A*
User Parameter Weights

"Gender" weight
"platform" weight
"character" weight
ESRP Weight
Price Weight

*Fig. 3B*
Game Parameter's Weights

| Game Parameter 1 | Game Data 1 | Game Name 1 |
|---|---|---|
| Game Parameter 2 | Game Data 2 | Game Name 2 |
| . | . | . |
| . | . | . |
| . | . | . |

*Fig. 3C*

RECOMMENDATION ENGINE FOR ELECTRONIC GAME SHOPPING CHANNEL

CROSS-REFERENCES TO RELATED APPLICATIONS

This application is a continuation of U.S. application Ser. No. 13/647,584 filed Oct. 9, 2012, now U.S. Pat. No. 8,721,455; which is a continuation of U.S. application Ser. No. 12/578,790 filed Oct. 14, 2009, now U.S. Pat. No. 8,298,087; which application claims the benefit of priority from provisional application No. 61/142,313 filed Jan. 2, 2009 and provisional application No. 61/240,672 filed Sep. 9, 2009; the contents of which are incorporated herein by reference.

TECHNICAL FIELD

The technology herein relates to a method and a system for recommending selections of computer and video games based on personalized player preferences and player profiles. In more detail, the technology herein relates to techniques using personalized information related to a computer game player's preferences to provide the player with suggestions about game titles and accessories that he might like to own or rent. Aspects of the technology herein ensure that no confidential usage information gathered concerning the user's game playing habits is disclosed or used without the user's knowledge and consent.

BACKGROUND AND SUMMARY

Every year, many game titles are introduced to the market in response to the great interest for new and exciting games. Due to the great number of available game titles, as well as the high rate of new releases, a game playing enthusiast may not be aware of all the game titles that are available. This may result in the player missing game titles that he would have been very interested in buying or renting due to the nature and contents of the game. It is often difficult for the game manufacturers to identify potential buyers who may be interested in the specific games the manufactures produce. This lack of communication with the buyer results in lost profits, and the manufacturer is left with inefficient ways to introduce and sell a new line of products.

Recommender systems are generally known as technology for allowing automated systems to recommend products or services to users. A typical recommender system provides a specific type of information filtering (IF) technique that attempts to present information items (e.g., movies, music, books, news, images, web pages, etc.) that are likely to be of interest to a user. Such a system helps the user deal with information overload while also providing an opportunity for a seller to make an additional, targeted sale. Such systems have long been employed as part of many electronic commerce websites to generate competitive advantage. Examples of recommender systems currently in use include among others:

Amazon.com (online retailer, includes product recommendations)
Arnie Street (music service)
Baynote (recommendation web service)
Collarity (media recommendation platform)
Daily Me (news recommendation system (hypothetical))
Genius (iTunes) (music service that is part of the iTunes Store)
inSuggest (recommendation engine)
iLike (music service)
Last.fm (music service)
Strands (developer of social recommendation technologies)
Netflix (DVD rental and online movie playing service)
Pandora (music service)
Reddit (news recommendation system)
Slacker (music service)
StumbleUpon (web discovery service)
StyleFeeder (personalized shopping search)

Typically, a recommender system compares a profile associated with a user to some reference characteristics, and seeks to predict the 'rating' that the user would give to an item he has not yet considered. For example, visitors to websites such as Amazon.com likely have seen the following type of message upon logging on to the website: "Latest authors you may like including . . . " followed by a list or graphical presentation of books or other items the website recommends to the user. Similarly, the Netflix website commonly recommends movies to its customers. Such recommendations are typically generated based on the particular customer's past purchases—i.e., items that are "like" items the customer has ordered in the past but without recommending the same exact items the customer has already purchased. Such recommendations can provide customers with useful information to guide them through a wide array of new products. The recommendations can also help website operators make additional sales. Thus, recommendations are often "win-win" for both the customer and the website operator.

Information about specific customers is especially helpful in recommending products to those customers. This is relevant to online or offline purchasing where personalized customer preferences are employed to market additional products and services to prior customers. In an example online operation, a customer preference profile is sometimes obtained by asking the customer to respond to a list of questions related to demographic personal information, buying preferences, and/or from tracking the customer's online activities. A computer program may then be used to model a profile for the client and predict the outcome of the customer's future behavior.

It would be beneficial to apply recommender technology to the marketing of video and computer games, and to provide methods and systems that make available in real time the preferences and buying habits of the computer game enthusiast and tailor these features to make suggestions for future use. However, there are significant challenges (e.g., privacy concerns, parental controls, and other factors) that have in the past stood in the way of launching an effective, efficient recommender system for video game consoles.

The exemplary illustrative non-limiting technology herein solves such problems by providing methods and systems for using information related to a computer game player to provide suggestions about game title availability and other game related features specific to the game player, while providing parental controls, privacy protection and other desirable features.

In one exemplary illustrative non-limiting implementation, an online recommendation service for computer game players is provided. A record of the online activities is generated and maintained for each player. The record includes identities of game titles downloaded, purchased, or gifted, and time spent playing each game by the player. Based on the record, the service provides recommendations of new games to be purchased or rented to the player. In addition the service offers information such as popularity of game titles with other players, popular search strategies and other game related information.

In one exemplary illustrative non-limiting implementation, the online service provides parental control settings for the online sessions, and provides customized settings depending on the playing level/expertise as well as the genre of the game. In addition, the exemplary illustrative non-limiting service offers privacy protection for the player before information is disclosed to generate and maintain the user's online activities. For example, the player can be asked to "opt in" to a game recommender system before any private or usage information about the player's game playing habits or preferences are disclosed to the recommender system. In some non-limiting implementations, there can be a variety of different matching algorithms for recommending with different algorithms being selected on a player-by-player basis depending on past success rates.

Some illustrative non-limiting techniques herein provide weighting of data by age. For example, when a given piece of data is collected from a user, a collection date can associated with that data. This enables the exemplary illustrative non-limiting system to calculate how old the data is. In one exemplary illustrative non-limiting example, older data has less influence and newer data has more influence. This exemplary functionality for example takes into account a game player's changing tastes.

Additional exemplary illustrative non-limiting features and advantages include:

- Collect and use how much time a player has played a game as a factor in recommending
- Keep track of game titles downloaded, game titles purchased on storage media, game titles gifted, game titles reviewed
- Allow users to rate games purchased and use such ratings as a factor in developing recommendations.
- Recommendations filtered so that games are not recommended that is outside of a parental controls setting
- Number of impressions on a portion of a game catalog can be used as a factor in developing recommendations.
- Popularity of titles with other people (e.g., friends) can be used as a factor in developing recommendations
- Price sensitivity (e.g., player tends to purchase games that cost 500 points or less) can be used as a factor in developing recommendations.
- Ability to collect search strategy (keyword, other search strategy)
- Ability to link to an affinity or loyalty account
- Game Playing level and/or experience can be used as a factor in developing recommendations.
- Ability to factor in personal preferences (e.g., a player who purchases only M games will have only M games recommended to him or her)
- Ability to recommend for download only games that the destination device has sufficient storage space to store.
- Ability to take into account games that other users having recommended to a game player.
- Ability to take genre preference (fighting games, adventure games, sports games, etc.) into account in developing a recommendation
- Possible to perform some of the analysis in a distributed manner (e.g., can send down recommendation software to a game console)
- Ability to recommend based on particular personally owned video game consoles
- Can recommend titles to purchase or rent, or can recommend titles to purchase in a retail store
- Can make several attempts at weighting or recommending, and select a method that is most efficient or successful (i.e., works the best) for this particular user for use in the future with this particular user.
- Privacy protection: the user must opt in before the video game console will disclose personal or personalized information to the recommendation server.

BRIEF DESCRIPTION OF THE DRAWINGS

These and other features and advantages of exemplary illustrative non-limiting implementations will be better and more completely understood by referring to the following detailed description in conjunction with the drawings of which:

FIGS. 3A-3C show exemplary illustrative non-limiting data structures;

DETAILED DESCRIPTION

Techniques described herein can be performed on any type of computer systems including personal computers, home video game machines, portable video game machines, networked servers, cellular telephones, personal digital assistants, or any other type of devices or arrangements having computation and graphical display capabilities. One exemplary illustrative non-limiting implementation includes a personally owned home video game system such as a Nintendo Wii™ video game system, a Nintendo DS™ or DSi™ or other personal device capable interactive computer graphics display system capable of playing games and/or running other user applications.

One exemplary illustrative non-limiting implementation is described below, but other implementations are possible. In an exemplary embodiment, a game player is connected to the Internet through a video game console and plays games online and/or downloads games for local play. The player may play games along with other players at other locations. A recommendation system recommends new or additional video games the player may wish to download for purchase or trial.

Figure 1:
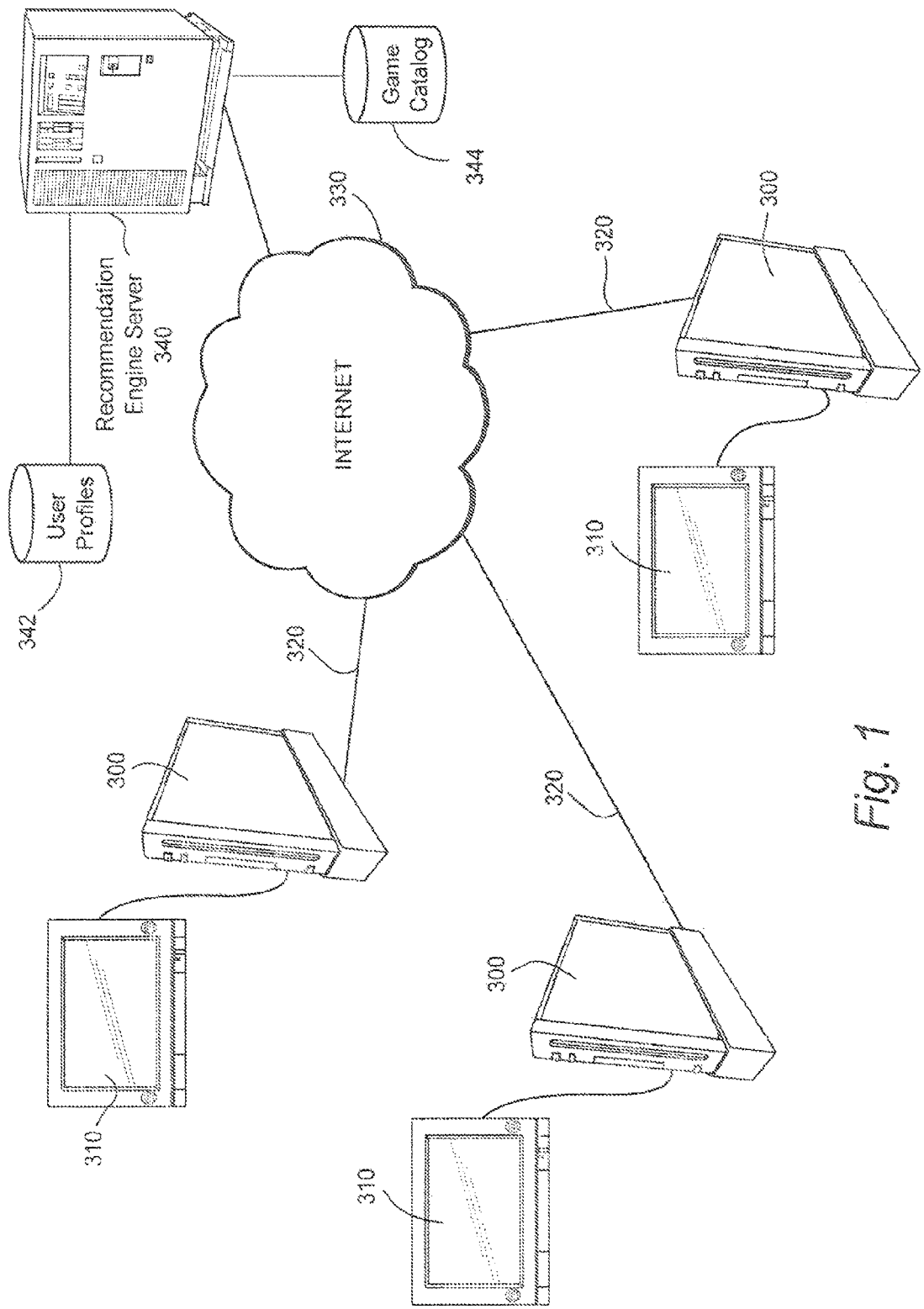
FIG. 1 schematically shows a non-limiting exemplary illustrative embodiment of a game recommendation system.

As shown in FIG. 1, a plurality of video game consoles 300 and associated displays 310 are connected to the internet 330 through connections 320 such as through internet server providers (ISP) or other means. Each player operating a game console 300 has access to a recommendation server 340. As an example, the recommendation server 340 may be a central service computer employing a recommendation engine implemented in software and/or hardware. The recommendation server 340 is connected to a player profile database 342 and a game catalog 344. Access to the recommendation server 340 results in an establishment of the player's information being available to the recommendation server 340 such as creation of identification records and online activities—assuming the player has given permission to disclose confidential information. Exemplary illustrative non-limiting implementations take great care to ensure that no confidential user information is disclosed without user knowledge and authorization.

The game consoles 300 may communicate with the recommendation server 340 through the Internet 330 in a known manner. For example, game consoles 300 can use an HTML-compatible or other browser or other suitable user interface to specify a link to the recommendation server 340 through a Uniform Resource Locator (URL), or other access means can be provided. The game consoles 300 can be coupled to the recommendation server 340 in ways other than through the internet 330. For example, a telephone wire or other connection may be used through modulator/demodulators (modem) or through other data communications means.

Using the recommendation server 340, a service provider can offer the game recommendation service for Internet players who play video games and are interested in buying and/or renting new games. Recommendations are made based on recommendation criteria which may depend on various factors, all of which are related to specific players.

In an illustrative non-limiting implementation, the recommendation server 340 creates and maintains player game profiles for the players. For a particular player, the recommendation server 340 recommends game titles for purchasing, or renting online, or for purchasing in a retail store based on the player's game profile. The recommendation server 340 can also provide other information.

In an exemplary embodiment, the recommendation server 340 may monitor and log, preferably in a secure and confidential manner, the total amount of time a particular player has played each specific game on his or her personal video game console. Such monitoring/logging can be performed in the exemplary illustrative implementation by each individual video game console. Game playing time may or may not be distinguished based on particular users (e.g., in some implementations that game console does not know who in a particular household is playing a game, and so logs all usage irrespective of individual game player to develop a collective usage log for all users of the personally owned home or portable video game playing device). For example, in some exemplary implementations, the video game console 300 may track game usage and report such usage to recommendation engine server 340 with the user's knowledge and consent. Such total playing time information provides an excellent indication of which games the particular player enjoys the most. In addition, the identity of the titles that have been played or downloaded for future playing by the player may be recorded—once again in a secure manner that is used and/or disclosed upon knowledge and consent of the player. Information can be maintained for example on which game titles the player has downloaded, which game titles the player has looked at, which game titles the player has purchased and obtained through other means such as by purchasing on a storage medium (such as a game disk), which games the player has given to other players, etc.

In this way, the player's preferences may be modeled to create a player game profile for suggesting other game titles. Thus, factors used in creating the player game profile may include a record of channels that have been visited, virtual console games that have been downloaded, purchased or gifted, and recommendation of registered "friends" of players who operate the video game consoles 300. In the exemplary illustrative non-limiting implementation, the number of impressions to a particular part of the catalog 344 may be tracked (e.g., the player likes to look at the Super Mario part of the catalog). There may also be an ability to link the player's account to a customer loyalty system.

Sometimes a video game player receives a recommendation about a specific game title from other video game enthusiasts and is eager to play it. This information may be taken into account when recommending a game to the player. This information may be entered by the player when he logs into the service provider website. The player may enter information about popularity of titles with other people, e.g., his/her friends. Many times a particular game becomes suddenly very popular; information about such game titles may be used in creating the game profile for the player.

In an exemplary embodiment, the player may enter preference information about several parameters related to a game itself. For example, the game genre, e.g., adventure, sports, puzzle may be used as one factor. In addition, the type of game platform compatible with a specific game may be used to recommend game titles. For example, a player may prefer to play games on a Nintendo 64 or Nintendo DSi game platform over other platforms. Another factor may be the player's sensitivity to the price of game titles. For example, the player may indicate that he/she buys games that cost only up to certain amount, but he/she is willing to rent games that cost more than the indicated price. Sometimes, video game players become very enthusiastic about a specific main game character, e.g., Mario. This information may also be use in creating the game profile. In addition, the ESRB rating of a particular game title, e.g., E, E10 or T, may be a determining factor in a player's choice of a particular title. In the exemplary illustrative non-limiting implementation, the engine 340 does not recommend games that exceed the rating level of a particular player (e.g., no recommendations of "Teen" or "Mature" games to seven-year-olds).

In another exemplary embodiment, the game playing level/expertise (e.g., beginner or expert) of the player for a particular game title owned affects the choice recommended by the service. The player may also be given the opportunity to rate each game he or she has downloaded (e.g., "hated it" or "loved it")

The recommendation service may offer a player the capability to personalize the game profile being offered. For example, the player may establish a parental control setting where the service will not recommend a game whose content is outside the guidelines set forth by the parental control setting. In addition, in filtering out games or other related features based on parental control setting, the service may also factor the player's preferences (e.g., if the player buys only M rated games, then only M rated games will be recommended).

Some computer game platforms contain limited amounts of storage available for game downloads. In one exemplary embodiment of the recommendation service, the size of the game is a factor in creating a game profile for a player. In other words, based on the amount of memory in the user's personal video game device available for game downloads, only games that can be accommodated are recommended. Users may be given a choice to delete prior downloads to free up space in some exemplary implementations.

In addition to recommending video game titles, the service may also be used to offer other features that may be useful to computer garners. In one exemplary embodiment, a player may obtain a search strategy that he/she conducted in trying to search for a specific title, a strategy and several key elements of which, such as keywords, was stored. The service may produce a specified search strategy upon request. In addition, the recommendation service may be used to recommend items other than game titles. For example, music, player guides, movies, etc. may be recommended to the player.

The recommendation service may receive different types of inputs for implementing the service. Some of the inputs may require active participation by the player, whereas others are passive. However, all can use an internet or other communications connection to collect relevant data.

In one exemplary embodiment, the video game console itself is used to record relevant data. For example, when a video game player uses the game console, his/her activity can be recorded to a file stored on the video game console itself. Such activity can be stored for example in a secure memory storage area if one is present. Subsequently, players may review this activity log in a Message board, where it can be filed as a message called "Today's Accomplishments". More specifically, the data recorded in the file includes applications that were used, e.g., different games, channels, etc., and actual time spent for each specific instance of use. For example, a player may play "Super Smash Bros. Brawl" for 30 minutes, then use the Internet Channel for 10 minutes, then the Forecast Channel for 3 minutes, then go back and play "Super Smash Bros. Brawl" again for an hour. Each of these events can be individually logged in the console. This player activities related information may then be uploaded to the recommendation engine 340. If a player agrees to share this information with the recommendation service provider, then the information would be automatically collected and uploaded to the service provider.

In another exemplary embodiment of the recommendation engine 340, one of the channels available to players may be used as a means for inputting data to the service. For example, when a Shop Channel is available, players may use the Shop Channel to download digital content (e.g., games, new channels, etc.). As mentioned above, while the video game players use this channel, the service provider may record the content accessed, purchased, or gifted. In addition, this may be further classified according to the type of game platform used. Other activities carried out via this channel, such as searching for game titles, may also be used as an input.

Another channel through which inputs to the recommendation service may be taken is the "Nintendo Channel". A channel can be provided to display videos and other related information about the complete catalog of games available for various platforms. A player may submit reviews of games that he/she has played (the identity of which is known from the related recorded information on the game console itself). This information may be used as an input to the recommendation engine 340 to create a model for the player's preferences, e.g., if the player likes game X then the player probably likes game Y; whereas if he/she does not like game A then he/she probably will not like game B.

When a video game is played on, for example, a video game system, game-related data is saved thereon. Typically, the progress state of a game played is stored so that when the player returns to play the game later, he/she can continue from exactly the point the last session ended. Moreover, the highest score achieved may be recorded. This information stored in the game console itself may be used as an additional input to the recommendation engine 340 to determine the expertise and level of playing ability of the player and be incorporated in the creation of the player model used in the recommendation. In this way, the recommender system can recommend games at the appropriate difficulty level for the particular user to provide a more enjoyable game playing experience.

In an exemplary embodiment, video game players may register the game system as well as individual game titles they purchased with a respective loyalty service, for example, Nintendo.com. Typically, game consoles have unique serial numbers and games are packed with a label comprising a unique code. This data may be used as an input to the recommendation engine 340 as well if desired, since a player's online activity can in some instances include data that links back to the serial number or other identifier associated with the game console.

The recommendation service may make recommendations available via an online shopping channel. In addition, they may be displayed to those players who own a loyalty account registered online. Such an account typically includes the email and physical address of the owner, hence recommendations may be delivered by mail, email, telephone or other method, or they may be delivered in other ways such as electronically to an "inbox" maintained by the video game console—or demo versions can be automatically downloaded to the user's console and made available for activation or play so the user can try them out.

Even though the above discussion has been focused on recommendation engines that are operable in conjunction with game consoles, other platforms may be used. The recommendation service may be used with any platform that allows for the logging of player activity, usage, etc.

Figure 2:
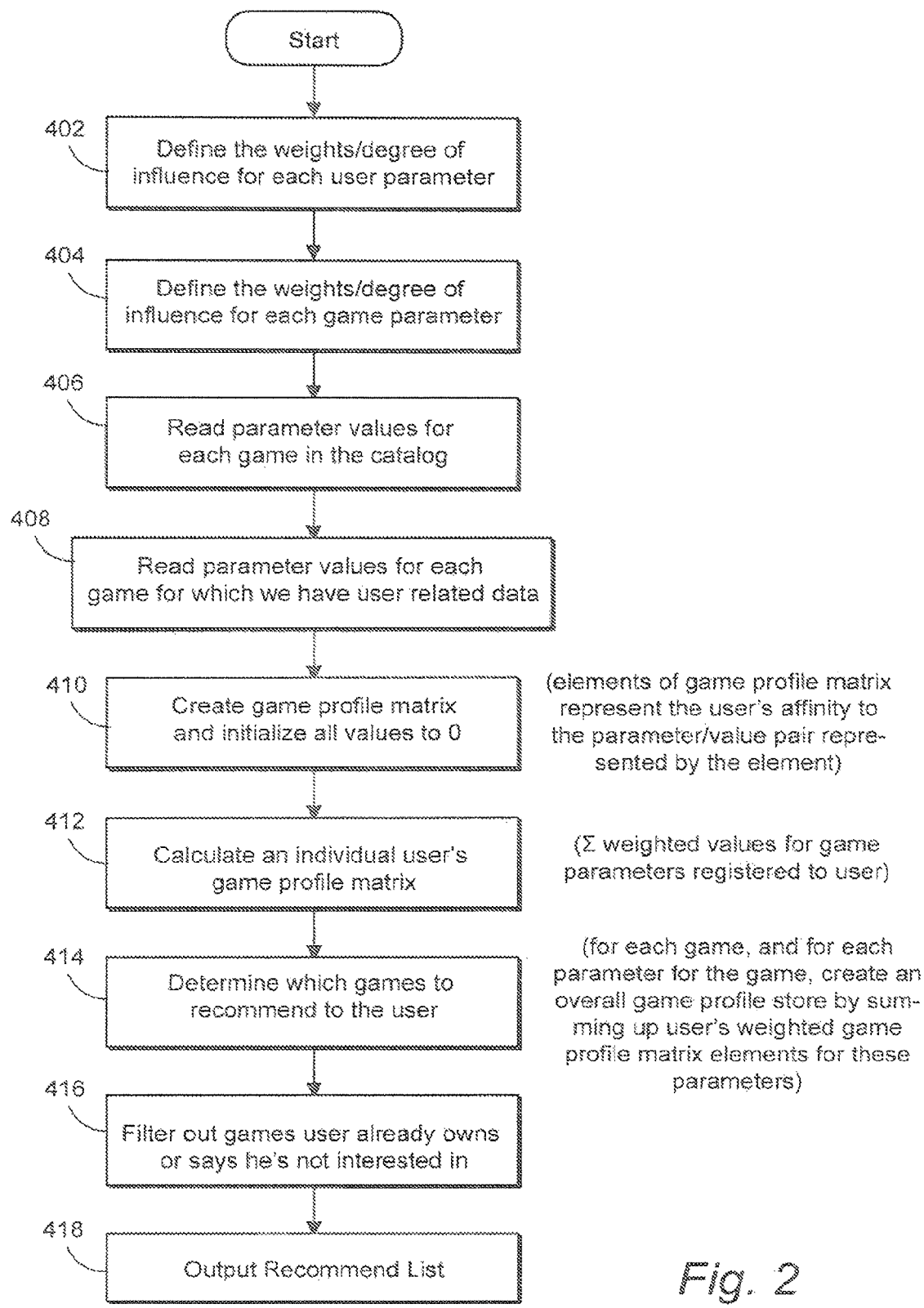
FIG. 2 shows an exemplary illustrative non-limiting method for recommending computer game programs to a player.

FIG. 2 shows a flowchart of an exemplary illustrative non-limiting process performed by recommender engine server 340 for recommending games to be downloaded, purchased or otherwise accessed by players. In the example shown, the first step (block 402) is to define the weights/degree of influence for each of plural parameters associated with a particular player. Useful player parameters that can be used for recommending games to a particular player include for example which games the player already owns, which games the player has rated (and how he has rated them), the amount of time the player has spent playing certain games, and which games the player's friends have recommended. FIG. 3A shows exemplary player parameter weights that can include for example a parameter weight associated with which games the player already owns; a parameter weight associated with games the player has rated in online rating questions/responses; a parameter weight associated with the amount of time the player has played certain games; and a parameter weight associated with games the player's friend(s) has recommended. Different weights may be assigned to these different parameters (for example, games the player owns may have a higher rating than games the player has merely rated.

Next, weights and degree of influence for each game parameter are defined (block 404). Game parameters that may be useful include game genre (e.g., adventure or puzzle), game platform (which video game system the game can play on), game character (e.g., the main character in the game, such as Mario, Link or Princess Peach), game rating (ESRB), game price (cost to download or purchase, in points or currency) and other. As shown in FIG. 3B, each such game parameter can be assigned a different weight (e.g., genre may count more than price or platform).

Once these weights are defined, the recommender engine 340 may read prestored parameter values for each game in current game catalog 344 and store them in memory. Next, the recommender engine 340 may read the parameter values for each game for which there is data related to the player, as stored in the player profile database 342 (block 408). Such player-relevant game specific data can include for example whether or not the player owns the game title, any rating the player has given to the particular games title (e.g., −1 indicating the player is not interested in the game title to 5 indicating the player loves the game), the number of minutes the player has played the game (this can be tracked by consoles 300), and the number of friends that have recommended the particular game title to the player.

Game recommender engine 340 next creates a game profile matrix with initial values of 0 (block 410). The game profile matrix includes elements (see FIG. 30) that represent the player's affinity to a parameter/value pair represented by that element. For example, if the game profile matrix parameter/value pair {Genre}{Adventure}=10, and the parameter/value pair {Genre}{Puzzle}=5, this would indicate that the player has shown a greater affinity to games with Genre=Adventure than to those games where Genre=Puzzle.

To populate the game profile matrix with meaningful values, the exemplary illustrative non-limiting implementation calculates an individual game player's game profile matrix by looping through all of the games for which there are data related to the player, looping through each parameter of the game, and looping through each parameter registered by the player for the game (block 412). The weighting factors discussed above are applied, and in the exemplary illustrative non-limiting implementation, the game recommender engine 340 sums the weighted values of those parameters to calculate an overall affinity.

Game recommender engine 340 then determines which games to recommend to the player (block 414) by performing the following algorithm: for each game, and for each parameter for the game, create an overall game profile score by summing up the player's weighted game profile matrix elements for these parameters:

```
For $gameName (keys %gameData) {
    $gameProfileScore = 0;
    for $gameParameter (keys %{$gameData($gameName}}) {
        $gameProfileScore +=
($gameProfileMatrix{$gameParameter}{$gameData{$gameName}
{$gameParameter}}*
$gameParameterwight{$gameParameter});
    }
    $recommendedGame{$gameName} = $gameProfileScore;
}
```

In the exemplary illustrative non-limiting implementation, a higher score means that the player has more affinity with the game.

The exemplary illustrative non-limiting implementation then filters out games that the player already owns or says he or she is not interested in or for which the recommendation score is negative (block 416), and sorts the remaining list from most to least recommended. The resulting stored list may be outputted to the player for display (block 418). The player may use the recommendations to order additional recommended games for download.

In the exemplary illustrative non-limiting implementation, some of the steps described above can be performed on the consoles 300 in a distributed manner. While the description above refers to "player", it an also relate to particular game consoles 300 (which can each have unique identifiers) and/or particular players using particular game consoles.

Figure 4:
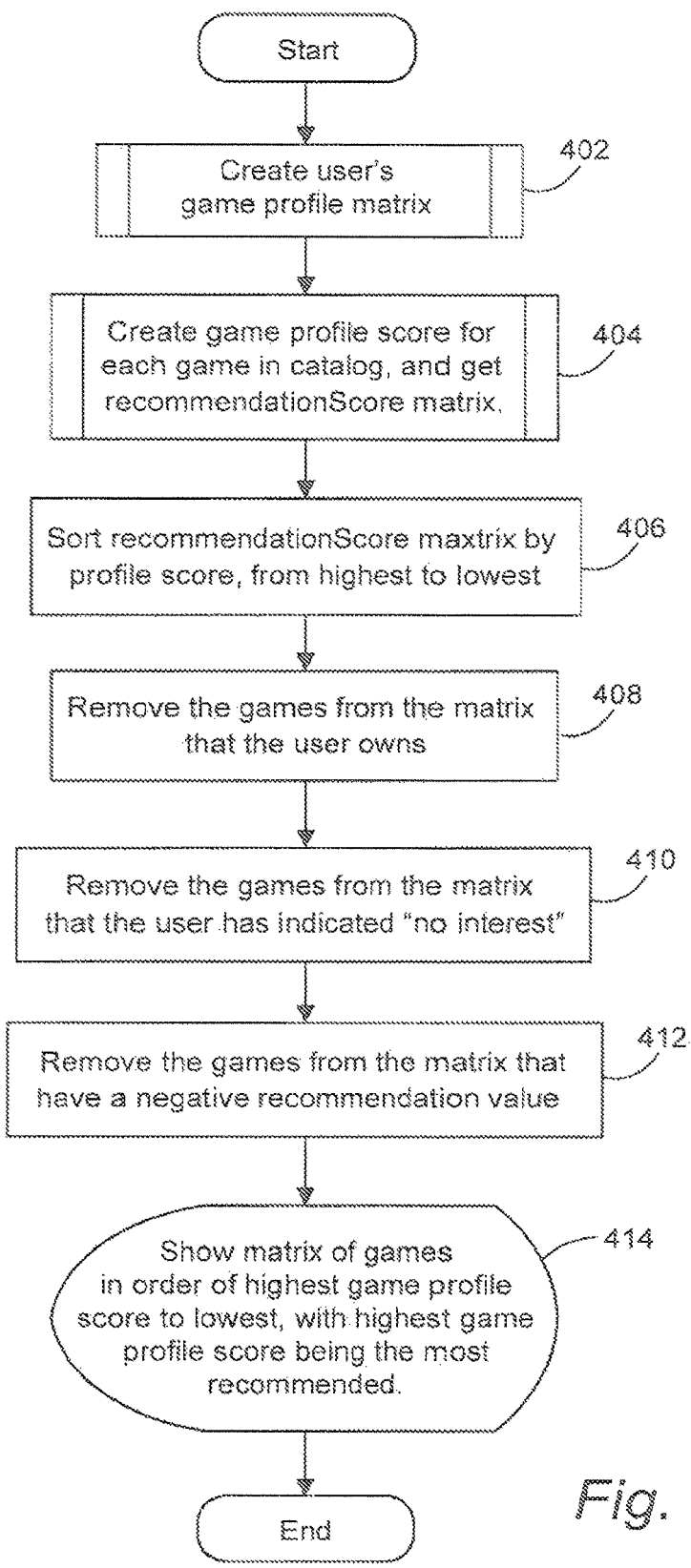
FIG. 4 shows another exemplary illustrative non-limiting method for creating a user's game profile matrix.

FIG. 4 is a flowchart of an exemplary illustrative non-limiting implementation of a further process for generating game recommendations based on a game profile score. In this illustrative non-limiting example, a user's game profile matrix is created (block 402). Such a game profile matrix defines characteristics of the user. Then, a game profile score is created for each game in the game catalog based on comparing the user's game profile matrix with characteristics of each game (block 404). The output of this process is a recommendation score matrix. This recommendation score matrix is stored by profile score, from highest to lowest (block 406). The exemplary illustrative non-limiting system removes games from the matrix that the user already owns (block 408) and may also remove games from the matrix that the user has indicated "no interest" (block 410) or which have a negative recommendation value (block 412). The exemplary illustrative non-limiting recommendation engine 340 then shows a matrix of games in order of highest game profile score to lowest, with highest game profile score being the most recommended (block 414).

Figure 5:
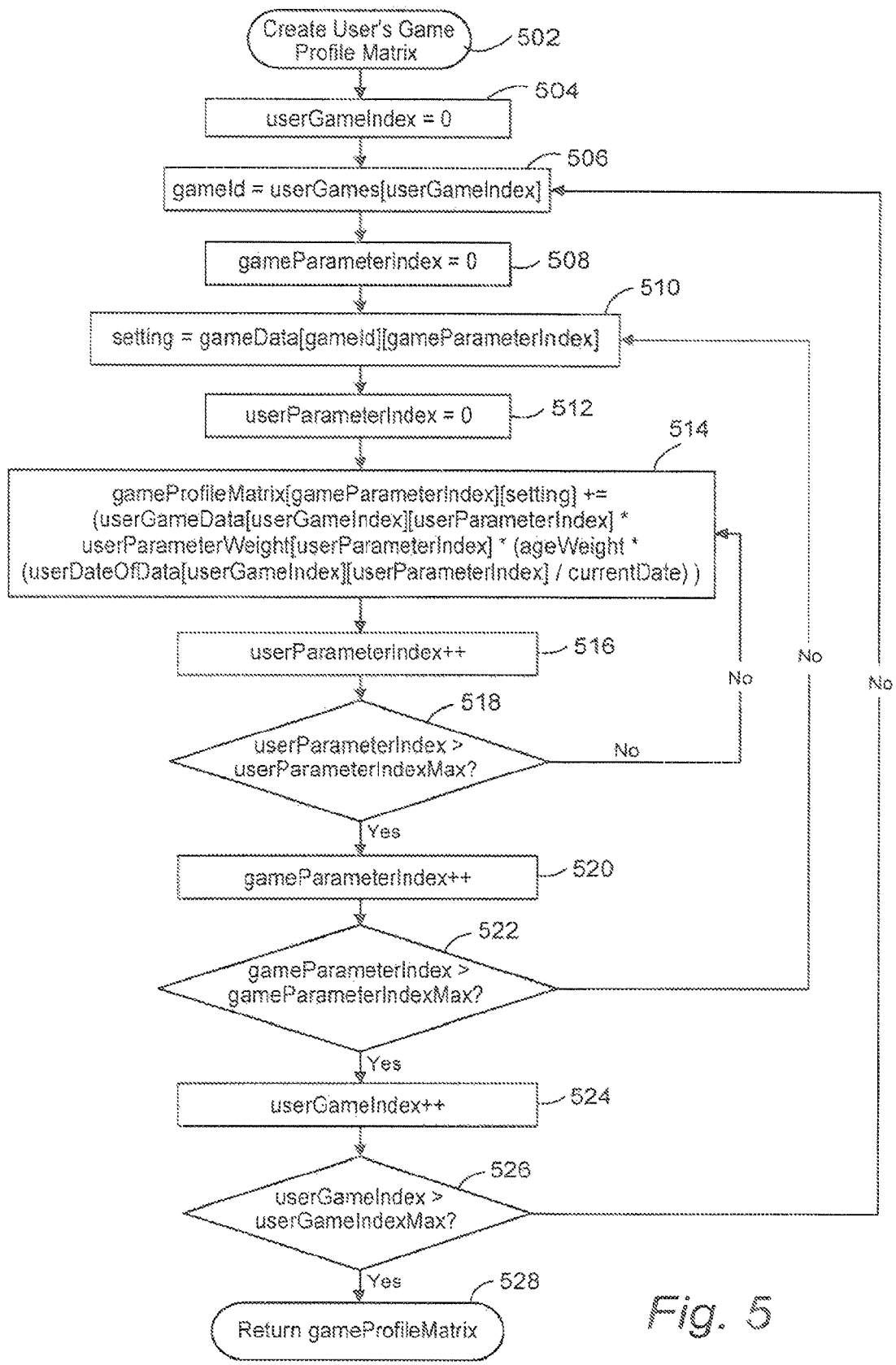
FIG. 5 shows a more detailed exemplary illustrative non-limiting method for creating the player's game profile matrix.

FIG. 5 shows a more detailed exemplary illustrative non-limiting flowchart of functionality used to create a user's Game Profile Matrix (block 502). In this example program controlled flow, a user game Index is initialized to zero (block 504). This is in preparation for looping through the matrix "userGames", which contains the gameID of every game that the user owns or has some other interaction with (for example, viewed in the catalog, saw an ad for, gave a review of, provided feedback on level of purchase intent, recommended to a friend, etc.). Game ID is set to the array value of userGames Indexed by the userGameIndex (block 506). A gameParameterIndex is also initialized to zero (block 508), in preparation for looping through the matrix "gameData", which contains all of the parameters associated with the game, such as ESRB rating, price, number of players, genre.

A "setting" variable is set to an array gameDate Indexed by both game ID and game parameter Index (block 510). [0001] This step is used to get the value of each parameter for the game. For example, for the "ESRB" parameter, the setting could be "T", or an enumerated version of this value, such as "3".

A userParameterIndex is similarly initialized to zero (block 512) in preparation for looping through all of the user parameters associated with this game, which indicate the user's interaction with the game, such as "owns," "rating," "time played," "recommended by a friend," "recommended to a friend." Note that some or all values could be negative (indicating a negative influence on the user's preferences).

A gameProfileMatrix value is then calculated as follows: gameProfileMatrix[gameParameterIndex][setting]+=(userGameData[userGameIndex][userParameterIndex]*userParameterWeight[userParameterIndex]*(ageWeight*(userDateOfData[userGameIndex][userParameterIndex]/currentDate)) (block 514). Note that age weighting is used in the exemplary illustrative non-limiting implementation to allow recent preferences to have a stronger influence than older preferences. Thus, the influence of a given parameter is tempered by a weight for the parameter, and the influence of a given data point collected from the user is tempered by the age of the data collected from the user, which is calculated by dividing the data of the collection of the individual data point (which could be expressed in number of days since a given fixed date, such as Jan. 1, 2000), by the current date (in days, using same fixed data calculation). This is further tempered by a weight of influence that the age has on the final value.

By looping through all of the game parameters and the user parameters, a matrix will be formed that will result in a level of user preference for a given game parameter. For example, if the user owns only T-rated games, rates T-rated games in the catalog highly, and recommends T-rated games to friends, then the gameProfileMatrix[ESRB][T] should be very high compared to gameProfileMatrix[ESRB][E]. This will be used later as games in the catalog are examined to develop a recommendation score. If a game in the catalog has an ESRB rating of E, the ESRB parameter contribution to the overall recommendation score will be lower than another game that has an ESRB rating of T.

The userParameterIndex is incremented (block 516) and tested to determine whether it exceeds a maximum (block

518). If no maximum is exceeded ("no" exit to decision block 518), then the incremented userParameterIndex value is used to access an additional set of array values (block 514). Similarly, the gameParameterIndex is incremented (block 520) and tested against a maximum (decision block 522), and the userGameIndex value is incremented (block 524) and tested against a maximum (decision block 526). In this way, the various arrays are stepped through based on userParameterIndex, gameParameterIndex and userGameIndex to access all values pertaining to the particular user and the game catalog, and these various Index values as incremented to maximums are used to collect together a gameProfileMatrix data set providing a measure of affinity between the user and each game in the game catalog.

Figure 6:
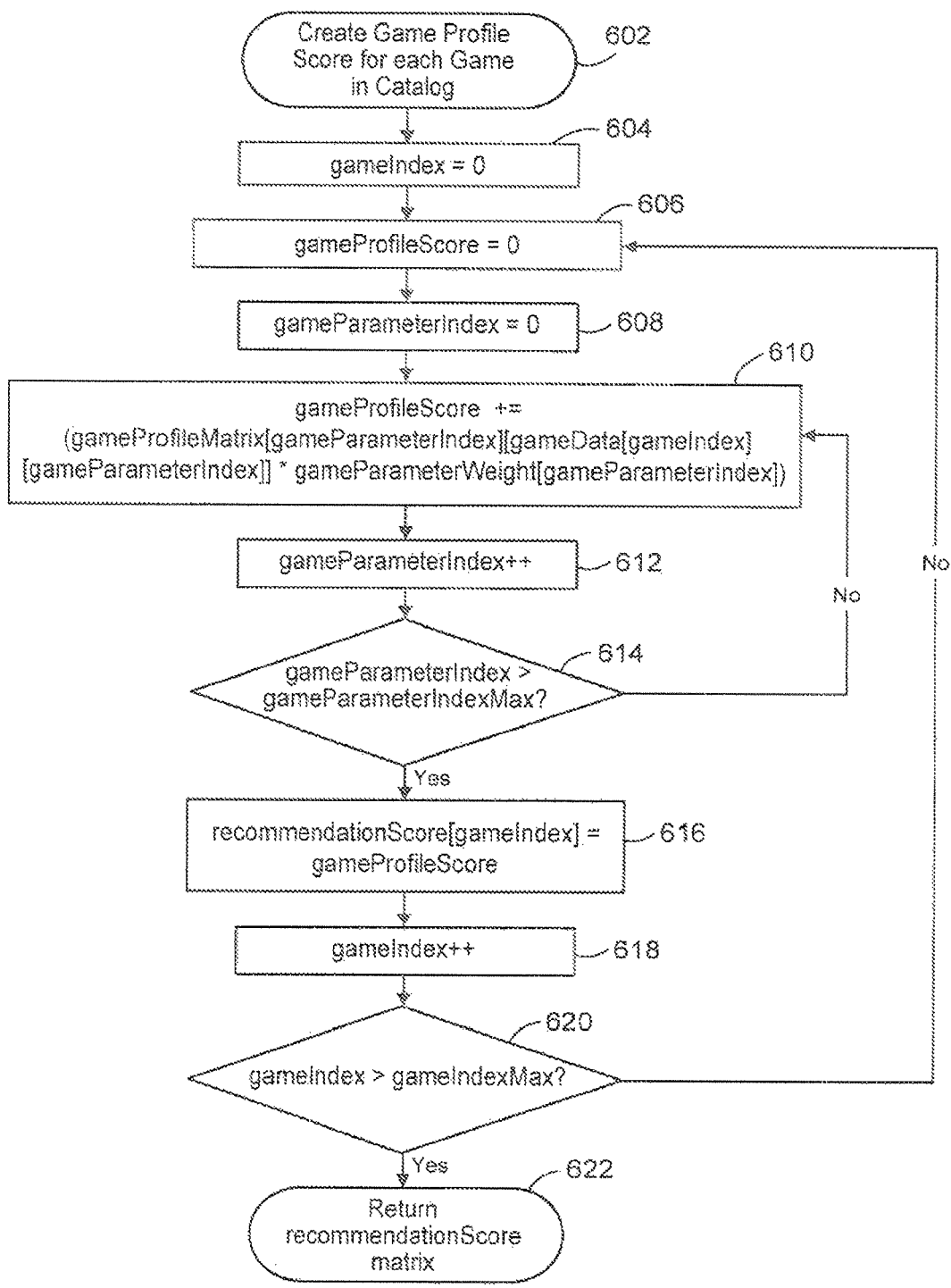
FIG. 6 shows an exemplary illustrative non-limiting method for creating a recommendation score matrix of games for the player.

FIG. 6 shows an example illustrative non-limiting flowchart of steps that may be performed to create a game profile score for each game in the catalog. In this example (block 602), a game Index, game profile score and game parameter Index are all initialized to zero (block 604, 606, 608). This is in preparation for looping through every game in the catalog, even if the user hasn't played the game or created any other interaction data about the game.

A game profile score is then calculated as: gameProfileScore+=(gameProfileMatrix[gameParameterIndex][gameData[gameIndex] [gameParameterIndex]]*gameParameterWeight[gameParameterIndex]) (block 610). This operation creates a score for the specified game by looping through all of the game parameters associated with that game (such as genre, platform, ESRB rating, price) and uses this value as the first dimension of the user's own gameProfileMatrix, and the second dimension coming from the game's value for this parameter. Each game parameter value is then weighted by its importance to the overall gameProfileScore. As an example, for example, if the user owns only T-rated games, rates T-rated games in the catalog highly, and recommends T-rated games to friends, then his gameProfileMatrix[ESRB][T] should be very high compared to gameProfileMatrix[ESRB][E]. If the game being evaluated has an ESRB rating of E, the impact on the gameProfileScore will be lower than another game that has an ESRB rating of T. Furthermore, the gameParameterWeight for ESRB may have a value of 0.5, whereas the weight for Price may be 2.0, meaning that price will have more of an impact on the overall gameProfileScore.

The gameParameterIndex, is incremented and tested against a maximum (block 612, 614) and the gameProfileScore value is modified based on an additional value accessed from the arrays. Similarly, the recommendationScore is then set to the gameProfileScore calculated by block 610 for the range of game parameter indices (block 616) and the gameIndex is incremented (block 618). The process is then repeated for each game in the catalog until the gameIndex value exceeds a maximum (block 620) at which time the routine returns a recommendationScore matrix (block 622).

While the technology herein has been described in connection with exemplary illustrative non-limiting implementations, the invention is not to be limited by the disclosure. For example, while the implementation described above relates to recommending games, other types of items such as accessories, player guides, movies, music, etc. could be recommended instead. Furthermore, the recommended items can be delivered to the player in a variety of ways including but not limited to download, physical delivery of physical media, delivery of links where the recommended items can be found, etc. The invention is intended to be defined by the claims and to cover all corresponding and equivalent arrangements whether or not specifically disclosed herein.

We claim:
1. In a network of distributed video game playing devices connected to a server via a network, a method for recommending video games to a player comprising:
   establishing a connection between a player's video game playing device and the server over a network to download game recommendations to the player's video game playing device;
   using at least one processor operatively coupled to the player's video game playing device, monitoring the player's game playing usage including how much time the player spends playing different game types;
   using the at least one processor, weighting said player's game playing usage by age comprising giving more recent game playing usage more weight than less recent game playing usage;
   using the at least one processor, generating player-specific game parameter weights based at least in part on how much time the player spends playing different game types;
   using the at least one processor, further weighting said player's game playing usage based on game parameters, including applying the generated player-specific game parameter weights based on how much time the player spends playing different game types; and
   automatically generating a recommendation that recommends at least one further video game for the player to download over the network based at least in part on said player's weighted game playing usage.

2. The method of claim 1 further including the at least one processor creating a score for each of a plurality of video games based on at least three of the following: genre, platform, ESRB, rating and price.

3. The method of claim 1 further including identifying with the at least one processor which games the player already plays on the game playing device and how long the player plays each of said games, the at least one processor basing said recommended at least one further video game at least in part in response to said identified games.

4. The method of claim 1 wherein said at least one processor in recommending takes into account games recommended by a friend of said player.

5. The method of claim 1 wherein said at least one processor in recommending takes into account games said player has recommended to a friend.

6. The method of claim 1 wherein said at least one processor in recommending includes filtering games the player already owns.

7. The method of claim 1 wherein said at least one processor in recommending includes not recommending games the player has previously indicated the player has no interest in.

8. The method of claim 1 wherein said processor in recommending includes not recommending games having a negative recommendation score.

9. A network of distributed video game playing devices comprising:
   a server;
   a network coupled to said server; and
   a plurality of video game playing devices communicating with the server over the network, each video game playing device monitoring player game playing usage and reporting said usage to the server after knowledge and consent by an associated player, said reported usage including how much time the player plays different games;
   said server executing instructions that control said server to
   (a) weight reported game playing usage by age comprising giving more recent game playing usage more weight than less recent game playing usage, (b) generate player-specific game parameter weights based at least in part on how much time the player spends playing different game types, (c) further weighting said player's game playing usage based on game parameters, including applying the generated player-specific game parameter weights based on how much time the player spends playing different game types, and (d) download a recommendation of at least one further video game to a video game playing device based at least in part on an associated player's weighted game playing usage.

10. The network of claim 9 wherein said server is configured to ascertain a player's favorite game character and bases a recommendation at least in part on said ascertained favorite character.

11. The network of claim 9 wherein said server is configured to filter recommended games based on parental controls dependent on player age restrictions.

12. In a network of distributed video game systems connected to a server via a network capable of downloading further game recommendations to the video game systems based on usage, a method for recommending video game related information to a player comprising:

with at least one processor, monitoring the player's game playing usage in a secure device within a personal video game system having a game storage, the monitoring including tracking how much time the player plays by game genre;

with the at least one processor, generating player-specific game parameter weights based at least in part on how much time the player spends playing different game genres, and further weighting said player's game playing usage based on game parameters, including applying the generated player-specific game parameter weights based on how much time the player spends playing different game genres and applying a further age-based weighting that gives more recent game playing usage more weight than less recent game playing usage;

with the at least one processor, determining the amount of game storage remaining on the player's video game playing device to accept downloaded games;

with the at least one processor, establishing a connection between the player's video game playing device and a server over a network;

reporting at least said determined amount of game storage remaining to accept a downloaded game; and automatically downloading at least one further recommended video game based on said player's weighted playing usage and said reported determined amount of game storage remaining to accept a downloaded game.

13. The method of claim 12 wherein the at least one processor maintains a record including identities of each game titles downloaded, purchased, and/or gifted, and time the player spends playing each said game title.

14. The method of claim 12 wherein the automatically recommending includes selecting from a plurality of different player-specific matching algorithms for recommending depending on past success rates for the player.

15. The method of claim 12 wherein the at least one processor records a collection date associated with data collected from the player, and uses the collection date to calculate how old the collected data is to provide for the older data to have less influence on the weighting than newer data.

16. The method of claim 12 wherein the at least one processor filters out recommendations to not recommend games that are outside of a parental controls setting.

17. The method of claim 12 wherein the at least one processor uses price sensitivity as a factor in developing recommendations.

18. The method of claim 12 wherein the at least one processor uses game playing expertise and/or experience as a factor in recommending games.

19. The method of claim 12 wherein the at least one processor recommends for download only games that a destination device has sufficient storage space to store.

20. The method of claim 12 wherein the at least one processor performs said weighting in a distributed manner across plural network-connected processors.

* * * * *